(12) United States Patent
Chen et al.

(10) Patent No.: US 11,271,411 B2
(45) Date of Patent: Mar. 8, 2022

(54) COMBINED STARTING POWER SUPPLY

(71) Applicant: Guangzhou Kaijie Power Supply Industrial Co., Ltd., Guangzhou (CN)

(72) Inventors: Ronghua Chen, Guangzhou (CN); Dexi Wang, Guangzhou (CN)

(73) Assignee: GUANGZHOU KAIJIE POWER SUPPLY INDUSTRIAL CO., LTD., Guangzhou (CN)

( * ) Notice: Subject to any disclaimer, the term of this patent is extended or adjusted under 35 U.S.C. 154(b) by 630 days.

(21) Appl. No.: 16/090,199

(22) PCT Filed: Mar. 24, 2018

(86) PCT No.: PCT/CN2018/080377
§ 371 (c)(1),
(2) Date: Sep. 28, 2018

(87) PCT Pub. No.: WO2018/219029
PCT Pub. Date: Dec. 6, 2018

(65) Prior Publication Data
US 2021/0210968 A1    Jul. 8, 2021

(30) Foreign Application Priority Data

May 31, 2017    (CN) .......................... 201710401782.3

(51) Int. Cl.
*H02J 7/00*    (2006.01)
*H01M 50/244*    (2021.01)
(Continued)

(52) U.S. Cl.
CPC ....... *H02J 7/00302* (2020.01); *H01M 10/052* (2013.01); *H01M 10/06* (2013.01);
(Continued)

(58) Field of Classification Search
CPC .. H02J 7/00302; H02J 7/0013; H02J 7/00306; H01M 10/425; H01M 50/204;
(Continued)

(56) References Cited

U.S. PATENT DOCUMENTS

| 8,574,747 | B2 * | 11/2013 | Okada | H01M 10/48 |
| | | | | 429/159 |
| 10,029,572 | B2 * | 7/2018 | Sakatani | B60R 16/033 |

(Continued)

FOREIGN PATENT DOCUMENTS

| CN | 1440892 A | 9/2003 |
| CN | 103812166 A | 5/2014 |

(Continued)

OTHER PUBLICATIONS https://arduino.ua/docs/DW01plus.pdf; Fangjing Technology Stock Co.,LTD, 1-Cell Lithium-ion Polymer Battery Protection IC (DW01+ battery protection IC), Aug. 2013, pp. 1-3 (Year: 2013).*

*Primary Examiner* — M Baye Diao

(57) ABSTRACT

The present invention discloses a combined starting power supply, comprising a lead acid battery, a lithium battery and a lithium battery protection circuit, wherein the lithium battery protection circuit comprises a first input, a second input, a first output and a second output; a negative electrode of the lithium battery is connected to the first input, and a positive electrode of the lithium battery is connected to the second input; and a negative electrode of the lead acid battery is connected to the first output, and a positive electrode of the lead acid battery is connected to the second output. The combined starting power supply of the present invention increases the safety thereof by adopting a lithium battery; and the lithium-ion battery is always put in a safe working state by means of the lithium battery protection circuit during charging and discharging processes. The purposes of the present invention are to remedy the defects of (Continued)

low specific energy and specific power of a lead acid battery, and to provide a starting power supply which has a small volume and a light weight and which is capable of providing an ultra-high power output for various transportation tools, so as to meet the working requirement that a transportation tool, such as a vehicle, can be started instantaneously, while extending the service life of the battery.

6 Claims, 2 Drawing Sheets

(51) Int. Cl.
  *H01M 50/267* (2021.01)
  *H01M 50/204* (2021.01)
  *H01M 10/052* (2010.01)
  *H01M 10/06* (2006.01)
  *H01M 10/42* (2006.01)
  *H01M 10/46* (2006.01)

(52) U.S. Cl.
  CPC ......... *H01M 10/425* (2013.01); *H01M 10/46* (2013.01); *H01M 50/204* (2021.01); *H01M 50/244* (2021.01); *H01M 50/267* (2021.01); *H02J 7/0013* (2013.01); *H02J 7/00306* (2020.01); *H01M 2010/4271* (2013.01)

(58) Field of Classification Search
  CPC ............. H01M 50/267; H01M 10/052; H01M 50/244; H01M 10/46; H01M 10/06; H01M 2010/4271
  USPC ......................................................... 320/126
  See application file for complete search history.

(56) References Cited

U.S. PATENT DOCUMENTS

| | | | |
|---|---|---|---|
| 10,741,896 B2* | 8/2020 | Ishii | H01M 4/505 |
| 2017/0106758 A1* | 4/2017 | Sakatani | B60R 16/033 |

FOREIGN PATENT DOCUMENTS

| | | |
|---|---|---|
| CN | 104600676 A | 5/2015 |
| CN | 107134844 A | 9/2017 |
| CN | 207074882 U | 3/2018 |

* cited by examiner

COMBINED STARTING POWER SUPPLY

TECHNICAL FIELD

The present invention relates to the field of chemical power supplies, and in particular to a combined starting power supply.

BACKGROUND ART

At present, it is well known that the lead acid battery has numerous advantages, such as a low price, a stable working voltage, large starting and discharging current, and re-usability of metal resources, thus having long been the primary starting power supply for transportation tools, such as vehicles, ships, airplanes and trains. However, the lead acid battery has low specific energy and specific power and it is usually suitable to start and discharge at current below a power of 10, while space left for built-in batteries in a variety of modern transportation tools gets narrower, and therefore it is necessary to find a new type of power supply system to meet the requirement of ultra-high power starting and discharging.

After entering into the 21st century, the fastest-growing chemical power supply is absolutely the lithium-ion battery, which has a small volume and a light weight and which is the chemical power supply with the highest specific energy nowadays.

However, the existing current power supplies still have the following defects:

the safety issue has not been fundamentally solved, and at present, there is no precedent of using a large-capacity lithium-ion battery as a power supply for starting large-scale transportation tools yet.

SUMMARY OF THE INVENTION

In order to overcome the deficiencies of the prior art, the purpose of the present invention is to provide a combined starting power supply, which can provide a high-power starting power supply for a vehicle.

The present invention is implemented by means of the following technical solutions:

A combined starting power supply, comprising a lead acid battery, a lithium battery and a lithium battery protection circuit, wherein the lithium battery protection circuit comprises a first input, a second input, a first output and a second output; a negative electrode of the lithium battery is connected to the first input, and a positive electrode of the lithium battery is connected to the second input; and a negative electrode of the lead acid battery is connected to the first output, and a positive electrode of the lead acid battery is connected to the second output.

Further, the lithium battery adopts a lithium iron phosphate battery.

Further, the lithium battery protection circuit comprises a lithium battery protection chip U1, an MOS transistor Q1, an MOS transistor Q2, a resistor R1, a resistor R2, a capacitor C1, a diode D1, and a diode D2; and the positive electrode of the lithium battery E1 is connected to one end of the resistor R1 and the positive electrode of the lithium battery E1 is connected to the first input, the first input is connected to the first output, the other end of the resistor R1 and one end of the capacitor C1 are connected to a power supply end of the lithium battery protection chip U1, the negative electrode of the lithium battery E1, the second input, the other end of the capacitor C1, a negative electrode of the diode D1 and a gate of the MOS transistor Q1 are all connected to a grounding end of the lithium battery protection chip U1, a discharging control end of the lithium battery protection chip U1 is connected to the gate of the MOS transistor Q1, a charging control end of the lithium battery protection chip U1 is connected to a gate of the MOS transistor Q2, the negative electrode of the diode D1, a drain of the MOS transistor Q1, and a drain of the MOS transistor Q2 are all connected to a negative electrode of the diode D2, a drain of the MOS transistor Q2 and a positive electrode of the diode are both connected to one end of the resistor R2 and the one end of the resistor R2 is connected to the second output, and the other end of the resistor R2 is connected to a charging detection end of the lithium battery protection chip U1.

Furthermore, the model of the lithium battery protection chip U1 is DW01+.

Furthermore, the rated capacity of the lead acid battery is 6 to 10 times that of the lithium battery.

Furthermore, the rated capacity of the lead acid battery is 6.67 times that of the lithium battery.

Furthermore, the lead acid battery adopts a 12 V, 30 Ah lead acid battery.

Furthermore, the combined starting power supply further comprises a battery housing and a battery cover, wherein a first accommodation groove for placement of the lead acid battery and a second accommodation groove for placement of the lithium battery are provided in the battery housing.

Compared to the prior art, the beneficial effects of the present invention lie in that:

the combined starting power supply of the present invention obtains a relatively reliable safety performance by adopting a lithium battery; and the lithium-ion battery is always put in a safe working state by means of the lithium battery protection circuit during charging and discharging processes.

REFERENCE NUMERALS

1. Negative electrode end of power supply; 2. Positive electrode end of power supply; 3. Lead acid battery; 4. Lithium battery; and 5. Lithium battery protection circuit.

DETAILED DESCRIPTION OF EMBODIMENTS

The present invention will be further described below in conjunction with the drawings and the detailed description, and it should be noted that the embodiments or the technical features described below can be arbitrarily combined to form new embodiments, without conflicting with one another.

Figure 1:
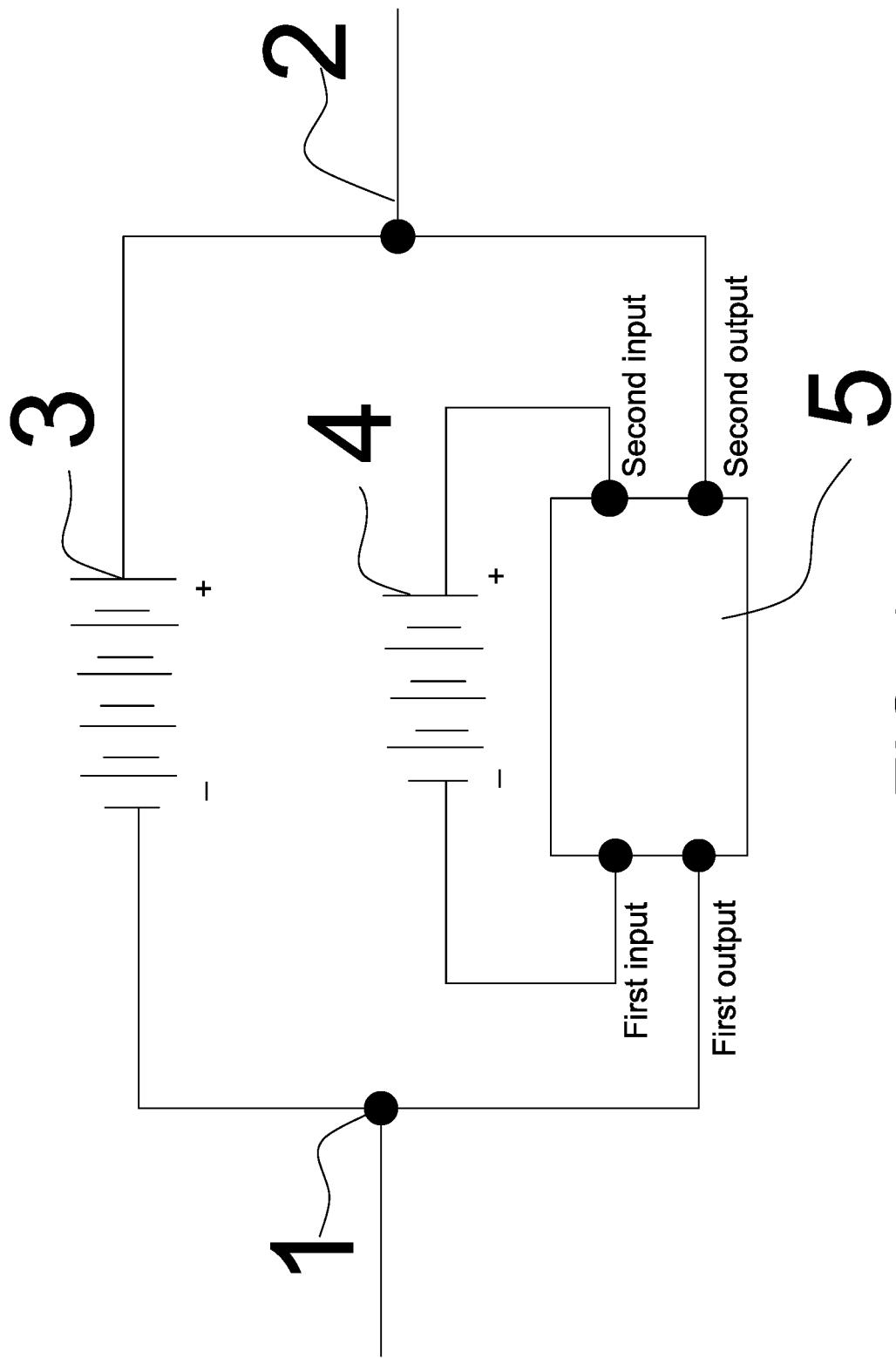
FIG. 1 is a circuit structural diagram of a combined starting power supply of the present invention.
Figure 2:
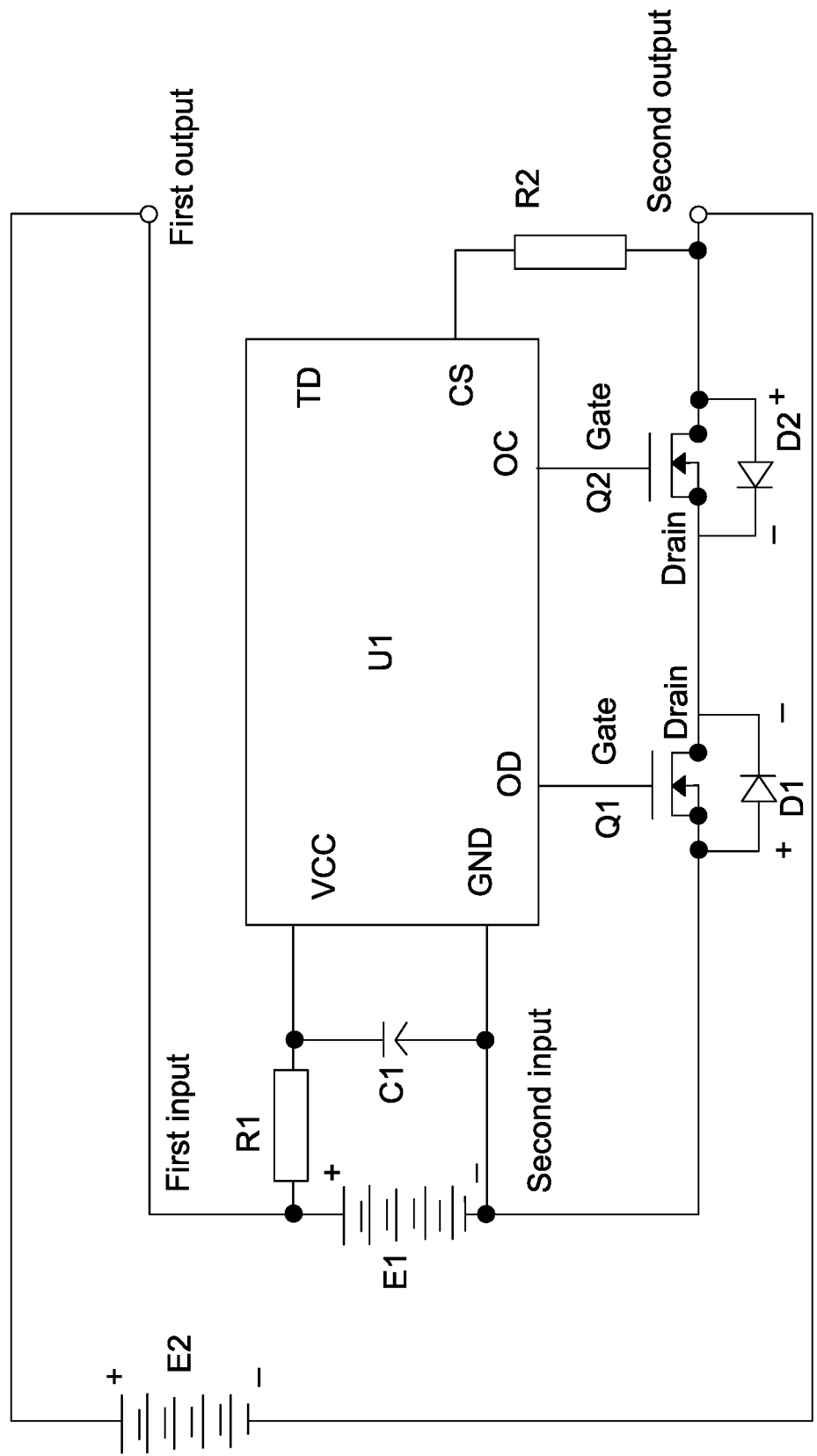
FIG. 2 is a circuit structural diagram of a lithium battery protection circuit of the present invention.

As shown in FIGS. 1 and 2, the present invention provides a combined starting power supply, comprising a lead acid battery 3, a lithium battery 4, and a lithium battery protection circuit 5, wherein a negative electrode of the lithium battery 4 is connected to one end of the lithium battery protection circuit 5, and a positive electrode of the lithium battery 4 is connected to the other end of the lithium battery protection circuit 5; and a negative electrode of the lead acid battery 3 is connected to the negative electrode of the lithium battery 4 to serve as a negative electrode end of power supply 1, and a positive electrode of the lead acid battery 3 is connected to the positive electrode of the lithium battery 4 to serve as a positive electrode end of power supply 2. The lithium battery 4 adopts a lithium iron phosphate battery; the rated capacity of the lead acid battery 3 is 6 to 10 times that of the lithium battery, and most preferably, the rated capacity of the lead acid battery 3 is 6.67 times that of the lithium battery 4; and the lead acid battery 3 adopts a 12 V, 30 Ah lead acid battery. The lithium battery protection circuit 5 comprises a first input, a second input, a first output, and a second output. The negative electrode of the lithium battery 4 is connected to the first input, and the positive electrode of the lithium battery 4 is connected to the second input; and the negative electrode of the lead acid battery 3 is connected to the first output, and the positive electrode of the lead acid battery 3 is connected to the second output. E2 in FIG. 2 represents the lead acid battery, wherein the first input and the first output are connected at the same end position, i.e., the positive electrode end of power supply, the second input is grounded, and the second output is connected to the negative electrode end of power supply.

The circuit of the combined battery works by means of parallel charging and discharging of two branches including a lead-acid storage battery branch and a lithium iron phosphate polymer battery branch, wherein the lithium-ion battery branch is further additionally provided with a lithium battery protection circuit for preventing over-charging and over-discharging of the lithium battery, so as to avoid a safety accident or battery failure due to over-charging and over-discharging. The lithium battery protection circuit 5 comprises a lithium battery protection chip U1, an MOS transistor Q1, an MOS transistor Q2, a resistor R1, a resistor R2, a capacitor C1, a diode D1, and a diode D2; and the model of the lithium battery protection chip U1 is DW01+. The positive electrode of the lithium battery E1 is connected to one end of the resistor R1, and the positive electrode of the lithium battery E1 is connected to the positive electrode end of power supply; the other end of the resistor R1 and one end of the capacitor C1 are connected to a power supply end of the lithium battery protection chip U1; the negative electrode of the lithium battery E1, the other end of the capacitor C1, a negative electrode of the diode D1 and a gate of the MOS transistor Q1 are all connected to a grounding end of the lithium battery protection chip U1; a discharging control end of the lithium battery protection chip U1 is connected to the gate of the MOS transistor Q1, and a charging control end of the lithium battery protection chip U1 is connected to a gate of the MOS transistor Q2; the negative electrode of the diode D1, a drain of the MOS transistor Q1, and a drain of the MOS transistor Q2 are all connected to a negative electrode of the diode D2; a drain of the MOS transistor Q2 and a positive electrode of the diode are both connected to one end of the resistor R2; and the one end of the resistor R2 is connected to the negative electrode end of power supply, and the other end of the resistor R2 is connected to a charging detection end of the lithium battery protection chip U1. VCC of the lithium battery protection chip U1 is the power supply end, GND is the grounding end, OD is the discharging control end, OC is the charging control terminal, and CS is the charging detection end.

The circuit is mainly composed of elements, such as the lithium battery protection chip DW01+, and charging and discharging control MOSFETs. Moreover, after the lithium battery is connected to the lithium battery protection circuit, a battery package outputs a voltage from the negative electrode end of power supply and the positive electrode end of power supply. During charging, an output voltage of a charger is connected between the negative electrode end of power supply 1 and the positive electrode end of power supply 2, current flows from the positive electrode end of power supply 2 to the positive electrode and the negative electrode of the lithium battery 4, and then passes through the charging and discharging control MOS transistors to the negative electrode end of power supply; during a charging process, when a voltage of the lithium battery 4 exceeds a threshold, the OC pin of the lithium battery protection chip U1 outputs a signal to switch off the charging control MOS transistor Q2, and the lithium battery 4 immediately stops being charged, thereby preventing the lithium battery 4 from being damaged due to charging; and during a discharging process, when the voltage of the lithium battery 4 drops to a certain threshold, the OD pin of the lithium battery protection chip outputs a signal to switch off the discharging control MOS transistor Q1, and the lithium battery 4 immediately stops discharging, thereby preventing the lithium battery 4 from being damaged due to over-discharging; moreover, the CS pin of the lithium battery protection chip U1 is a current detection pin, and when an output is short-circuited, the conduction voltage drops of the charging and discharging control MOS transistors increase sharply and the voltage at the CS pin rises rapidly, and the lithium battery protection chip outputs signals to rapidly switch off the charging and discharging control MOS transistors, thereby achieving over-current or short-circuit protection.

The combined starting power supply of the present invention is arranged in a battery housing, wherein a first accommodation groove for placement of the lead acid battery 3 and a second accommodation groove for placement of the lithium battery 4 are provided in the battery housing. Six cell placement positions for the lead acid battery 3 are provided in the first accommodation groove, so that the lead acid battery 3 can be placed in series in the battery housing; and the second accommodation groove is used for placement of the lithium iron phosphate battery and the protection circuit therefor. The specific manufacturing and installation methods for the battery are as follows:

The first step of the manufacturing process for the novel combined battery: putting the six cells of the lead acid battery into the first accommodation groove in series; then, sealing a cover sheet of the corresponding accommodation groove with an adhesive, and welding external end posts of the lead acid battery pack respectively to positive and negative terminals of power supply on the battery cover; and then, performing the operation procedures of adding acid, charging, and releasing a safety valve, and sealing the large cover sheet, so as to complete the assembly of the lead acid battery portion first. The second step: placing 4 soft-package lithium iron phosphate batteries and a circuit protection board therefor in the second battery groove of the battery housing, wherein the circuit protection board is placed above the 4 soft-package lithium iron phosphate batteries, the soft packages of the lithium batteries as well as the circuit protection board are fixed in the battery housing by using a fixing adhesive, and 2 terminal lines, i.e., the positive and negative terminal lines, of the circuit protection board are connected to connection holes at the positive and negative terminals of power supply by means of welding or in a fixed way, respectively, so as to complete the parallel connection of the lead acid battery pack and the lithium battery. The third step: sealing the battery cover and recharging the novel hybrid battery, so as to complete the manufacturing of the battery of a combined structure.

The reasons for choosing the combination of a lithium iron phosphate battery and a lead-acid battery are as follows: the lithium iron phosphate battery has a reliable safety performance; and a single cell of the lithium iron phosphate battery provides a low voltage, and 4 cells of the lithium iron phosphate battery connected in series provide a voltage substantially the same as that of a 12 volt lead acid battery. After being fully charged, the combined battery has an end voltage of about 13 volts, and during the period in which the stock of combined batteries is set aside, the open-circuit voltage drops at a very slow rate, and the lithium-ion battery is always put in a safe working state by means of the circuit protection board during charging and discharging processes.

Considering that the price of a lithium battery is 4 times or much higher than that of a lead acid battery currently, according to the actual requirement of starting and discharging of a vehicle, the provided lithium battery preferably has a small capacity in general, and the rated capacity of the lead carbon battery matching with the lithium battery is 6 to 10 times that of the lithium battery. In this way, the loss of capacity of the lithium battery during storage can be compensated by the lead acid battery at any time, so as to ensure that the battery pack can be put into normal use immediately after being set-aside for 3 to 6 months. Therefore, the outline dimension of the battery housing of the present invention is determined according to the requirement of the installation dimension of the vehicle in actual use, and the outline dimension thereof is consistent with the dimension of a conventional 12 V, 30 Ah lead acid battery. Six single compartments of the same size in the battery housing are space for installing the 12 V, 20 Ah lead acid battery, and another horizontal single compartment is space for installing the 12 V, 3 Ah lithium iron phosphate battery and the circuit protection board therefor. Thus, the ratio of rated capacity between the lead acid battery and the lithium battery in the combined power supply is 6.67:1, and the performance of the combined battery reaches and exceeds the performance of the conventional 12 V, 30 Ah lead acid battery.

The circuit protection board in the lithium battery is to further protect the performance consistency and safety of the cells of the lithium battery. The circuit protection board used here is a mature technical product in the market at present, and is directly used by reference.

The design of the parallel circuit of the lead carbon battery and the lithium-ion battery is shown in FIG. 1 in detail, in which the end voltages of the batteries, when fully charged, at the two branches are both at about 13.0 V, which can effectively prevent self-discharging due to voltage unbalance inside the battery pack; and meanwhile, the self-discharging rate of the lithium iron phosphate battery itself is higher than that of the lead acid battery, but the capacity of the lithium iron phosphate battery is only 1/10 to 1/6 of that of the lead acid battery in the design of this battery pack, and therefore the lead acid battery can instantaneously recharge the lithium iron phosphate battery, so that the circuit quickly tends to enter a balance state, and the loss of capacity of the battery pack is extremely small, thereby ensuring that the battery pack can be normally started and used after being set aside for 8 months. The time period for the setting aside of the novel combined battery is substantially consistent with the time period for the setting aside of the conventional lead acid battery, within 6 months to 1 year, which are much higher than the time period for the setting aside of the lithium battery of 3 to 6 months.

The large current in the two branches of the lead acid battery and the lithium battery in the power supply are superimposed together to generate an ultra-high power output during starting and discharging, thereby ensuring the instantaneous starting of the vehicle, etc.

Under the same volume condition, compared with the conventional lead acid battery for starting, the weight-to-power ratio of starting and discharging of the combined power supply can be increased by more than 40%, and the cycle life can be extended by more than 30%.

After large-current discharging, the combined battery is charged for 6 h at a constant voltage of 15.5 V, and a current limit of 6 A; after being charged for about 15 minutes, the charging current of the lithium battery drops from 4 A to 0 A; and the current of the lead acid battery rises from 2 A at the beginning to 6 A (within 15 minutes), and then the current drops to near 0 A within about 45 minutes. In addition, when the combined battery is discharged at 150 A for 10 seconds at the normal temperature, contributed current of the lithium battery is 58 A; when the combined battery is discharged at 200 A for 10 seconds at the normal temperature, the contributed current of the lithium battery is 74 A; and when the combined battery is discharged at 400 A for 10 seconds at the normal temperature, the contributed current of the lithium battery is 124 A The analysis of the test result of the combined starting power supply is as follows: the new combined battery has the same outline size as that of the conventional lead acid battery, while the weight of the new combined battery is 73% of that of the conventional lead acid battery; and the rated capacity of the new combined battery is only 75% of that of the conventional lead acid battery, but the starting power and energy of the new combined battery at the normal temperature at current of 400 A are equivalent to, and almost the same as, those of the conventional lead acid battery. By means of calculation, the weight-to-power ratio and weight-to-energy ratio of the combined battery of the present invention arrive at nearly 150% of those of the conventional lead acid battery, and the cycle life is nearly 130% of that of the conventional lead acid battery. Analysing from the perspective of current, voltage and time of charging and discharging in this test, the combined battery of the present invention has reliable safety performances for charging and discharging. It can be seen from this test that the combined battery of the present invention has a slightly poor low-temperature starting performance, but the starting performance thereof is getting better and better with the increase in the number of times of starting. The previous low-temperature starting performance of the combined battery can also meet the starting requirement.

The comparison between test data of the combined battery of 20 ampere-hour lead acid battery+3 Ah lithium battery and test data of the conventional 30 ampere-hour lead acid battery is obtained according to the test, as shown below in table I:

TABLE I

|  | Combined battery of 20 ampere-hour lead acid battery + 3 Ah lithium battery | Conventional 30 ampere-hour lead acid battery |
|---|---|---|
| Outline dimension and weight | 166*126*175 mm, 7.7 kg | 166*126*175 mm, 10.5 kg |
| Specification | 12 V, 24 Ah | 12 V, 32 Ah |
| CCA at −18 degrees | / | Time for discharging to 7.2 V at 400 A is 30 seconds |
| At the normal temperature of 25 degrees, discharging at 400 A current for 5 seconds, and then stopping for 10 seconds, and performing 10 cycles; an end voltage of each discharging. | 9.98 V, 9.94 V, 9.91 V, 9.88 V, 9.81 V, 9.71 V, 9.62 V, 9.41 V, 9.15 V, 8.80 V, wherein current contributed by each discharging of the lithium battery is respectively: 135 A, 135A, 135 A, 136 A, 138 A, 139 A, 141 A, 142 A, 145 A, 146 A | 9.66 v, 9.62 v, 9.56 v, 9.50 v, 9.51 v, 9.45 v, 9.39 v, 9.33 v, 9.27 v, 9.21 v |
| At −18 degrees, discharging at 400 A current for 3 seconds, and then stopping for 10 seconds, and performing 10 cycles; an end voltage of each discharging. / | 7.62 v, 7.45 v, 7.33 v, 7.24 v, 7.19 v, 7.16 v, 7.15 v, 7.17 v, 7.21 v, 7.28 v, wherein current contributed by each discharging of the lithium battery is respectively: 70 A, 70 A, 72 A, 75 A, 78 A, 80 A, 88 A, 98 A, 108 A, 118 A | 8.29 v, 8.21 v, 8.14 v, 8.07 v, 8.00 v, 7.94 v, 7.88 v, 7.83 v, 7.79 v, 7.74 v |
| At −18 degrees, discharging at 350 A current for 3 seconds, and then stopping for 10 seconds, and performing 10 cycles; an end voltage of each discharging. / | In cycles ①→⑦, the end voltage gradually drops from 6.35 V to 5.97 V, and then in cycles ⑦→⑩, the end voltage gradually rises to 6.01 V. | / |
| Cycle life | According to a capacity of 40% of 24 Ah or at −10° C, 240 A and time of 45 seconds, the number of cycle times is determined to be 325. | According to a capacity of 40% of 32 Ah or at −10° C, 240 A and time of 45 seconds, the number of cycle times is determined to be 250. |

The embodiment described above is only a preferred embodiment of the present invention and should not be used to limit the scope of protection of the present invention, and any insubstantial changes and substitutions made by a person skilled in the art on the basis of the present invention fall within the scope of protection of the present invention.

We claim:

1. A combined starting power supply, comprising a lead acid battery, a lithium battery and a lithium battery protection circuit, wherein the lithium battery protection circuit comprises a first input, a second input, a first output and a second output; a negative electrode of the lithium battery is connected to the first input, and a positive electrode of the lithium battery is connected to the second input; and a negative electrode of the lead acid battery is connected to the first output, and a positive electrode of the lead acid battery is connected to the second output the lithium battery protection circuit comprises a lithium battery protection chip U1, an MOS transistor Q1, an MOS transistor Q2, a resistor R1, a resistor R2, a capacitor C1, a diode D1 and a diode D2; and the positive electrode of the lithium battery E1 is connected to one end of the resistor R1, and the positive electrode of the lithium battery E1 is connected to the first input, the first input is connected to the first output, the other end of the resistor R1 and one end of the capacitor C1 are connected to a power supply end of the lithium battery protection chip U1, the negative electrode of the lithium battery E1, the second input, the other end of the capacitor C1, a negative electrode of the diode D1 and a gate of the MOS transistor Q1 are all connected to a grounding end of the lithium battery protection chip U1, a discharging control end of the lithium battery protection chip U1 is connected to the gate of the MOS transistor Q1, a charging control end of the lithium battery protection chip U1 is connected to a gate of the MOS transistor Q2, the negative electrode of the diode D1, a drain of the MOS transistor Q1, and a drain of the MOS transistor Q2 are all connected to a negative electrode of the diode D2, a drain of the MOS transistor Q2 and a positive electrode of the diode D2 are both connected to one end of the resistor R2, and the one end of the resistor R2 is connected to the second output and the other end of the resistor R2 is connected to a charging detection end of the lithium battery protection chip U1.

2. The combined starting power supply of claim 1, wherein the lithium battery adopts a lithium iron phosphate battery.

3. The combined starting power supply of claim 1, wherein the model of the lithium battery protection chip U1 is DWO1+.

4. The combined starting power supply of claim 1, wherein the rated capacity of the lead acid battery is 6 to 10 times that of the lithium battery.

5. The combined starting power supply of claim 4, wherein the rated capacity of the lead acid battery is 6.67 times that of the lithium battery.

6. The combined starting power supply of claim 1, wherein the lead acid battery adopts a 12 V, 30 Ah lead acid battery.

* * * * *